United States Patent [19]
Bailey

[11] 4,426,846
[45] Jan. 24, 1984

[54] HYDRAULIC POWER PLANT

[76] Inventor: Wayne Bailey, R.D. #2, Schaghticoke, N.Y. 12154

[21] Appl. No.: 899,469

[22] Filed: Apr. 24, 1978

[51] Int. Cl.³ ............................................. F03B 13/06
[52] U.S. Cl. ........................................ 60/398; 60/698
[58] Field of Search ............... 60/398, 407, 412, 413, 60/416, 698

[56] References Cited

U.S. PATENT DOCUMENTS 3,939,356  2/1976  Loane ............................. 60/398 X

FOREIGN PATENT DOCUMENTS 2527121  12/1976  Fed. Rep. of Germany ........ 60/398
229211   2/1925   United Kingdom ................. 60/398

Primary Examiner—Allen M. Ostrager

[57] ABSTRACT

A plurality of hydraulic turbines is provided to generate electrical energy. A first hydraulic turbine is powered by the flow of water from an upper reservoir to plurality of holding tanks. Compressed air is used to return the water from the tanks to the reservoir. A second hydraulic turbine is provided in the return line which connects the tanks with the reservoir.

1 Claim, 3 Drawing Figures

HYDRAULIC POWER PLANT

Certain public utilities use off peak power to elevate water to have it available for power production over peak periods. In doing this, they use carbon fuels.

But carbon fuels such as coal, oil and natural gas are becoming increasingly expensive. Moreover, their sources are not limitless.

There is an increasing need or a continuous pumped storage power system, accomplishing its result by means of fuelless power.

A continuous pumped storage power system that will not pollute and poison the atmosphere is greatly needed.

Fossil fuels have other uses far more important than their combustion for power production, such as dyes, petro-chemicals, plastics, films, man-made fibers, fertilizers, etc. It is now merely a matter of time before their burning as fuels will eventually cease all together.

In applicant's issued U.S. Patents as well as those to be issued in the near future, it is shown how compressed air can be made to come from a wide variety of fuelless power sources. While some of the compressed air sources are intermittent, when they are combined with hydraulic continuous power sources as it is here described, they can be made practical constant sources of energy useful for public power purposes.

Therefore, the present invention involves using several types of fuelless power to build up a continuous supply of compressed air which in operating combination with large hydraulic rams and continuous hydroelectric installations operating from a high reservoir of liquid (or several of them) makes possible and practical a total fuelless power producing unit highly useful and desirable from many aspects.

Presently, there are four general types of power producing equipment in wide use in electrical generation today. Two are fueled and two are fuelless. Those that are fueled use either carbon or atomic fuels. Those that are fuelless are either continuous or intermittent. While this present invention can be considered as using fuelless intermittent power producing apparatus, basically it is a continuous means and method of producing kilowatts of electricity. It makes use of a liquid power storage system, highly positioned, that operates continuously.

The process by which the system stays in continual operation is two-fold. One by dropping water from the elevated pump storage reservoir, hydro-electric energy is created. That energy can produce compressed air. While the compressors are doing that, the water is led to and through several receiving tanks consecutively. However, at the same time (this is the second part of the system in operation) air from other sources (to be outlined later in the application) are also feeding air through lines in order to combine forces with the compressed air generated to raise the water up and beyond the surface of the water in the reservoir. When this water is returned to the reservoir, it creates power to be used for public consumption. However, the water returned above the elevated pump storage reservoir is not pushed by the air until it reaches an elevated level in each of the receiving tanks. This is insured by uptake pipes to be outlined later in a more detailed way in the application and self-closing check valves. The elevated level in each of the receiving tanks allows for greater power generation in order that the air compressors generate enough pressure, combined with the other sources of air in order to be able to lift the substance to that height and to repeat the same performance over and over again.

The other sources of air outlined above are supplemental sources of air power that can be of a continuous nature or of an intermittent cycle. These sources will be outlined as we explain the various operations contained in FIG. 3.

Figure 1:
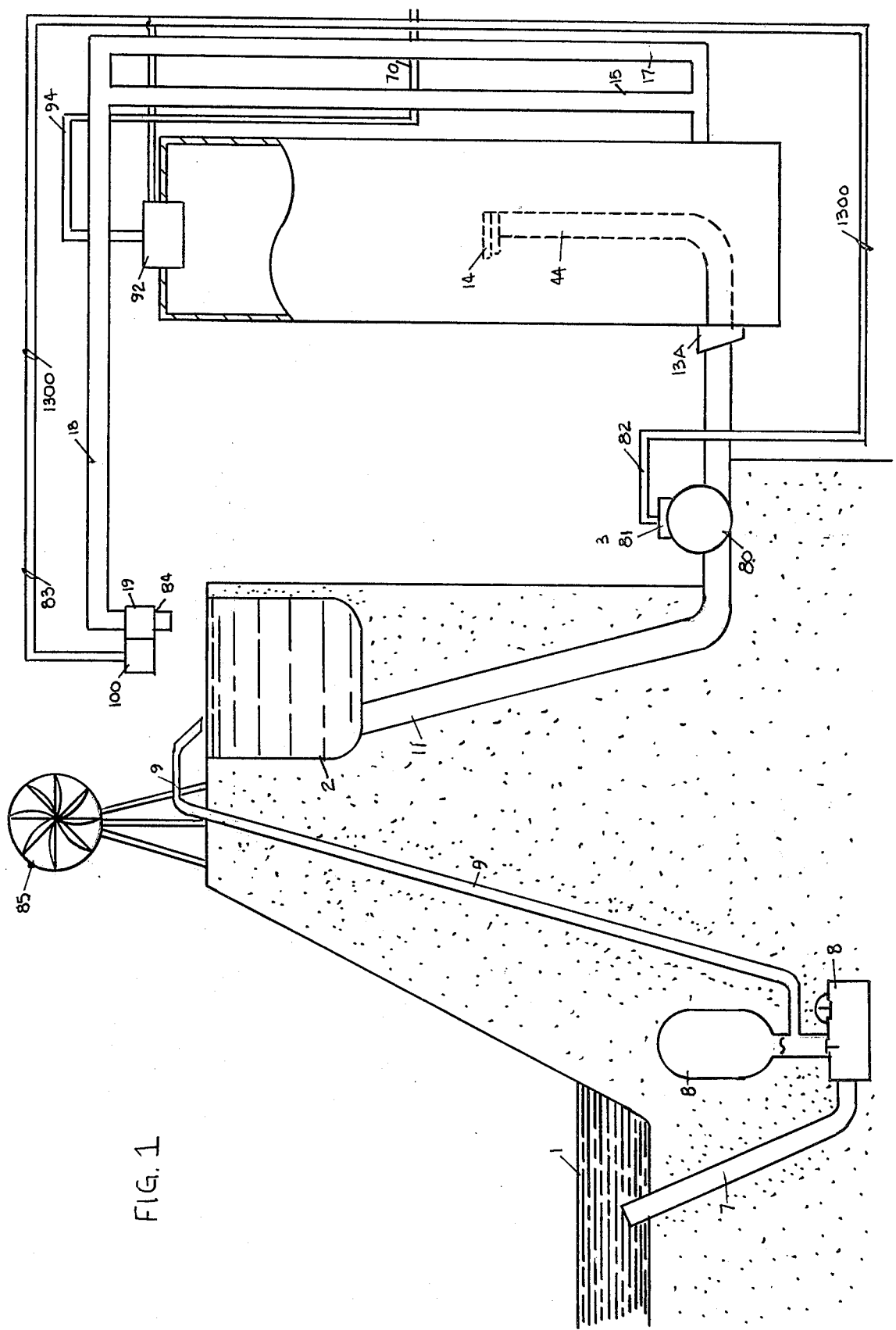
FIG. 1 is a diagrammatic side view of the hydraulic power plant.
Figure 2:
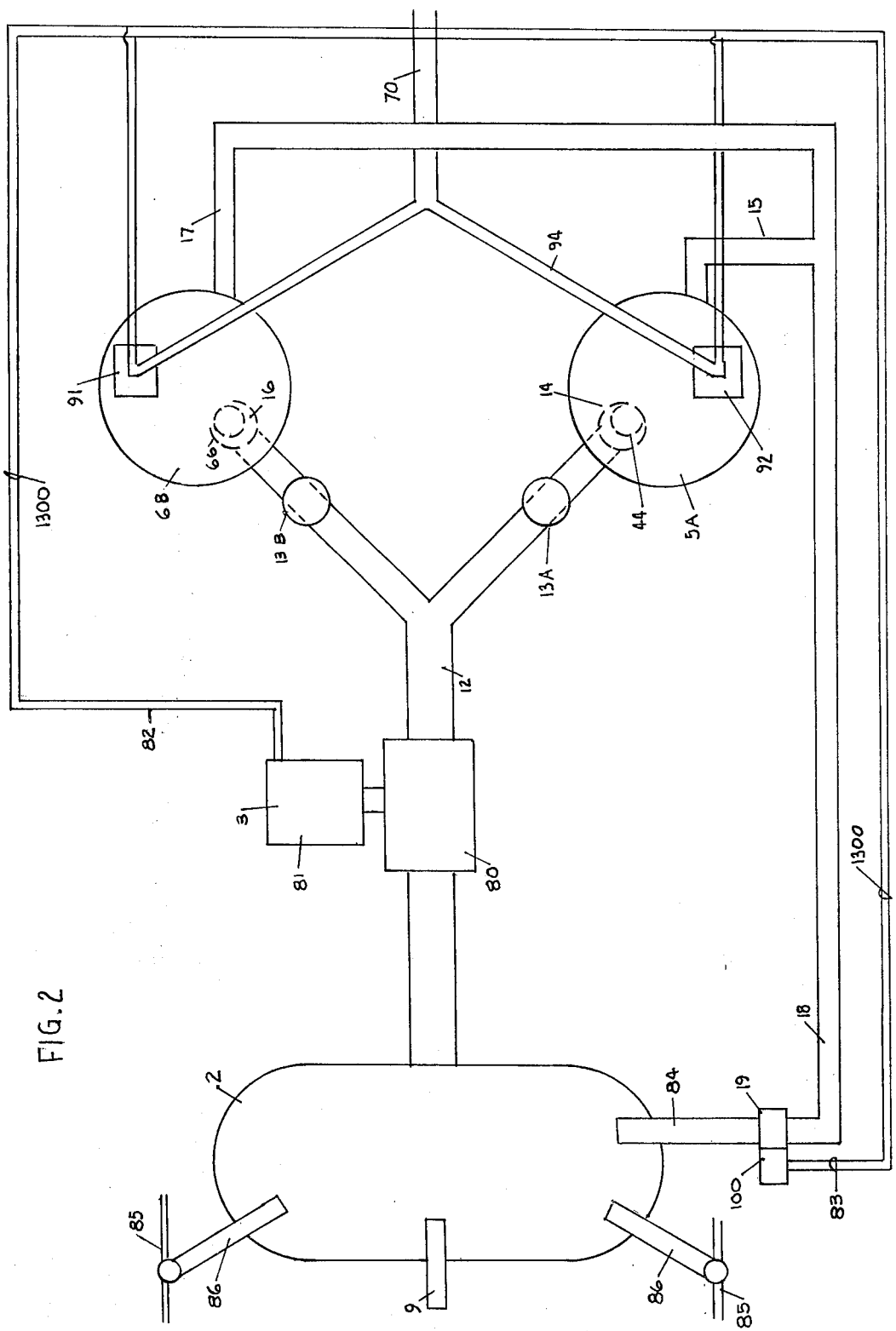
FIG. 2 is a top view of FIG. 1.

Looking at the complete system closely, starting with FIGS. 1 and 2, the water falling from elevated reservoir 2 through pipe 11 goes through water wheel 80 through valve 13A into water receiving tank 5A. Water wheel 80 is connected to generator 81 which provides electrical power to the power lines 82 which connect to power lines 1300. The water leaving water wheel 80 climbs up pipe 44 and issues out into tank 5A through check valve 14. When the water level in this receiving tank reaches check valve 14 at the top of pipe 44; the check valve 14 automatically closes. At the same time, valve 13A closes, and the water coming from water wheel 80 starts into receiving tank 6B through valve 13B which has opened to permit this to happen.

When all this has taken place, air compressor 92 begins to function on electric power received from overhead power lines 1300. Compressor 92 receives compressed air under substantial pressure from compressed air line (pipe) 70 that is getting its supply of compressed air from compressed air storage tank 51. Under air pressure from air compressor 92, the water in tank 5A is driven downward into water pipe 15 and upward through pipe 15 to overhead pipe 18 which carries the water on to upper water wheel 19 and through pipe 84 into the upper water reservoir 2. Water wheel 19 is connected to generator 100 which provides electrical power to the power lines 83 which connect to power lines 1300.

While all this is going on water in receiving tank 6B is getting its water through valve 13B from the water wheel (lower water wheel) 80 in FIG. 2, where in tank 6B the same sequence of events as just previously described (in tank 5A) is taking place (in tank 6B). In tank 6B when the water reaches a height up to and even with check valve 16 at the top of standpipe 66, the check valve 16 closes, while valve 13B closes and the air compressor 91 in FIG. 2, begins to function pushing the water in tank 6B down into pipe 17 and up into pipe 18 and on to upper water motor 19 and out through outlet pipe 84 in FIG. 2.

Then air compressor 92 (also shown in FIG. 2) is delivering compressed air into water receiving tank 5A it is receiving compressed air through pipe 94 which is getting its compressed air directly from pipe 70. While both air compressors are receiving compressed air from pipe 70, the power needed to boost the pressure of this compressed air is being delivered to each air compressor to 91 and 92 by electric wires leading from each air compressor to power line 1300. But this electric power is only turned on when each air compressor starts to compress air in order to drive out the water that has accumulated in each separate water receiving tank.

In the meantime upper water reservoir 2 is receiving water pumped by water pumping windmills 85 and 85 (in FIG. 2) when the wind blows sufficiently to cause these windmills to pump water. The water so pumped by these windmills in FIGS. 2 is emptied into upper reservoir 2 through water pipes 86 and 86.

Figure 3:
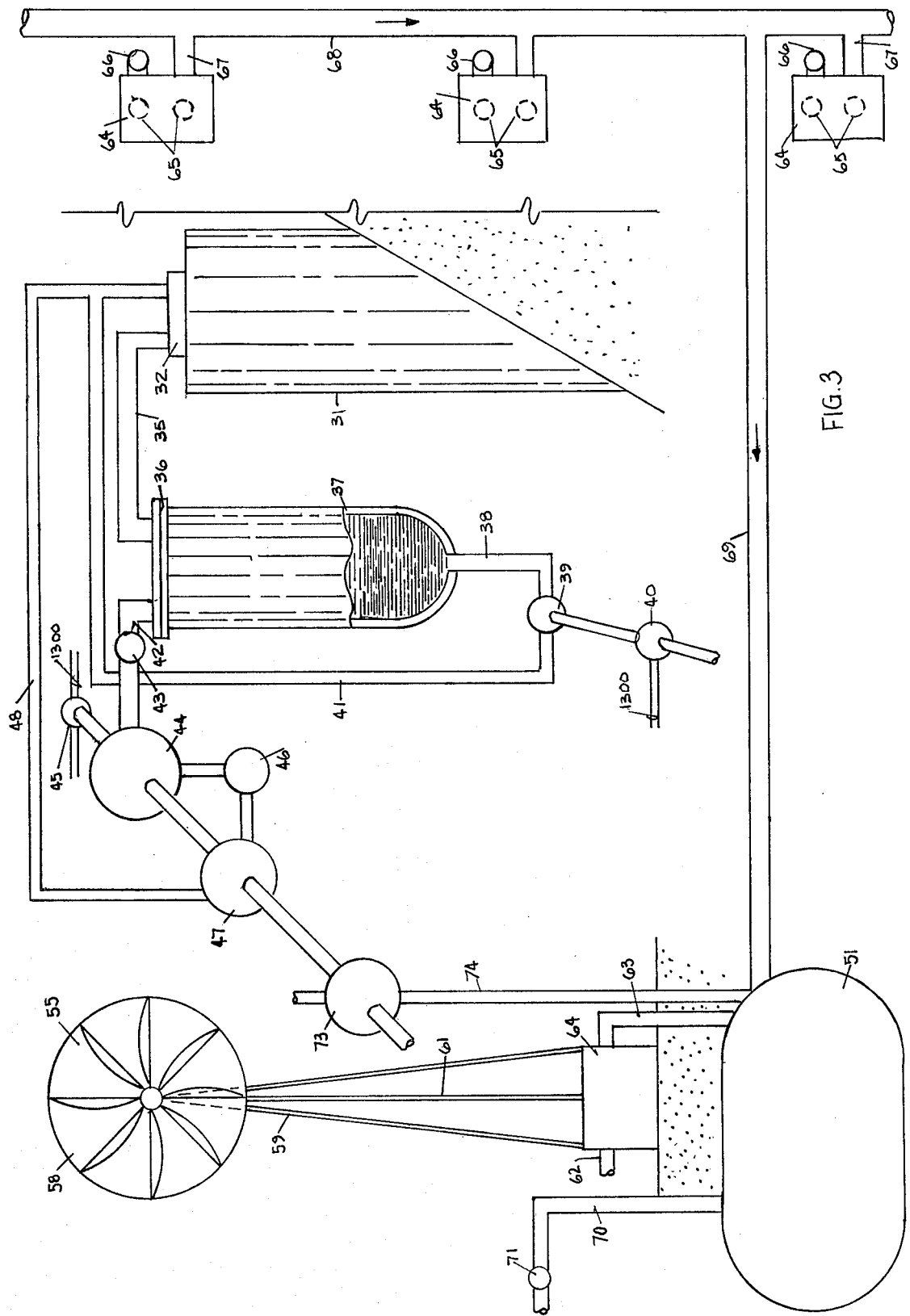
FIG. 3 is a diagrammatic lay-out that shows the variety of sources of compressed air that can be used to supplement the air compressing portion of FIG. 1.

In FIG. 3 . . .

While all these things are taking place in FIGS. 1 and 2 over in FIG. 3 in a roadway subjected to lane vehicular (autos, trucks, buses, etc.) traffic, road vehicles are compressing air as detailed in my issued patent U.S. Pat. No. 3,918,844. In FIG. 3, these traffic actuated air compressors are intermittently furnishing compressed air to compressed air tank 51. The air compressing units 64 are preferably provided with rubber tires acting as bellows, check valves preventing the backward flow of air once it has been compressed by the weight of the moving traffic over the rubber tire bellows. The details of this entire air compressing apparatus arrangement appear in my above mentioned patent.

Air enters the bellows through pipe 66 and leaves under pressure through pipe 67 into compressed air main 68 and 69 delivering said traffic compressed air into compressed air tank 51. This is an intermittent source of compressed air.

Another intermittent source of compressed air as shown in FIG. 3 is a windmill 58. Instead of being a water lifting or water pumping windmill as is shown in FIG. 1, this windmill in FIG. 3 is an air compressing windmill. And it compresses air only when the wind blows sufficiently to operate the windmill fan 55. It is shown here as a Greek type windmill with flexible sails, and with a central drive shaft 61 driving an air compressor 64, the fan being held up on a structural frame 59. Air to be compressed enters air compressor 64 through pipe 62 and the compressed air leaves the compressor 64 through pipe 63. Check valves not shown are positioned in pipe 63 to avoid back pressure into compressor 64 from compressed air tank 51, into which the compressed air in pipe 63 empties.

Also in FIG. 3, I show a continuous source of compressed air deriving its power from either hot springs, geothermal steam (or geothermal heat) or volcanic heat, coming from a heat gathering "U" tube as it is completely shown in my issued U.S. Pat. No. 3,965,363. Relatively less heated water, or cool water enters my "U" tube (underground "U" tube) through pipe 33 one comes out through pipe 35 containing underground heated working fluid. This underground heated fluid can be water or a low boiling type liquid. In tube 35 it is a mixture of hot liquid and hot vapor now under pressure and enters liquid vapor separator 36, where in the liquid and vapor are separated, the liquid shown as numeral 37 being pumped out of separator 36 by tube 38 and liquid pump 39 driven by electric motor 40 which can receive its electric current from electric lines 1300. The pumped hot liquid in tube 41 is then returned to pipe 33 wherein it goes into the underground "U" tube to be reheated by underground heat. The pressurized vapor in separator 36 goes by tube 42 through throttle valve 43 into steam or vapor turbine 44 and from turbine 44 to condenser 46 from which it is again pumped by condenser pump 47 and tube 48 back into the intake pipe ("U" tube intake pipe) 33 to be reheated underground in the underground "U" tube. At one end of the turbine shaft is electric generator 45 contributing power to power lines (not shown here) 1300. At the other end of the turbine shaft is condensor pump 47 and air compressor 73. The short tube sticking up from air compressor 73 is its air (atmospheric air) admission pipe, and extending downwardly from air compressor 73 is compressed air tube 74 having a check valve not shown (to keep compressed air from compressed air storage tank 51 from backing up into air compressor 73). This geothermal or volcanic heat fuelless power system can be considered as a continuous (rather than intermittent) type of fuelless power producing unit. The air leaving compressed air storage tank 51 goes through tube 70 and check valve 71 into pipes 94 and 93 (see FIG. 2) and thus into air compressors 92 and 91 respectively. Compressors 92 and 91 are electrically connected as shown in FIG. 2 to the main power line 1300.

It will be noted that to accomplish my goals in this inventive system, I rely upon intermittent and continuous fuelless power sources of pumping in order to get a liquid (probably water) into my elevated supply. I also use continuous and intermittent fuelless power driven sources of compressed air coming into the system from the opposite direction, with overall 1300 electric lines to provide electric power wherever and whenever it is needed to keep the whole power producing operation moving ceaselessly, to provide a constant flow of electric current. The excess electrical power in lines 1300 that is not used by the system to operate, (such as in air compressors 91 and 92) is to be used for public consumption.

I claim:

1. An hydraulic power system comprising:
   (a) a first reservoir of liquid;
   (b) a second reservoir located at an elevation higher then the first reservoir;
   (c) means for pumping the liquid in the first reservoir to said second reservoir;
   (d) a plurality of holding tanks located at a lower elevation than that of said second reservoir;
   (e) a fluid conduit connecting said second reservoir with said holding tanks;
   (f) an hydraulic prime mover located in said conduit, whereby liquid flowing from said second reservoir to said tanks generates a work output;
   (g) automatic valve means in the fluid conduit and cooperatively associated with each tank such that liquid flows from said conduit into only one tank at a time, said valve means automatically stopping liquid flow into a tank when a predetermined liquid level in said tank is reached, and upon cessation of flow in one tank, automatically commencing flow of liquid to the other tank;
   (h) means for removing liquid from the tanks when the predetermined liquid level is reached and liquid flow to the tank is stopped by the valve means;
   (i) said means for removing liquid including at least one air compressor in which compressed air is used to said liquid from each tank under the pressure of the compressed;
   (j) said means for removing liquid further including a second conduit for receiving liquid driven from said tanks and for delivering said liquid to the second reservoir;
   (k) a second hydraulic prime mover located in said second conduit for obtaining a work output from the flow of liquid in said second conduit;
   (l) whereby liquid alternatively fills one tank from the second reservoir while liquid in the other tank is being returned to the second reservoir from the other tank,
   wherein work is produced by liquid flow to and from said tanks by the prime movers.

* * * * *